United States Patent
Zhao et al.

(10) Patent No.: US 9,908,780 B2
(45) Date of Patent: Mar. 6, 2018

(54) METHODS AND SYSTEMS FOR PREPARING GRAPHENE

(71) Applicant: EAST CHINA UNIVERSITY OF SCIENCE AND TECHNOLOGY, Shanghai (CN)

(72) Inventors: Chongjun Zhao, Shanghai (CN); Shudi Min, Shanghai (CN); Xiangmao Dong, Shanghai (CN); Xiuzhen Qian, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 15/030,583

(22) PCT Filed: Oct. 31, 2013

(86) PCT No.: PCT/CN2013/086328
§ 371 (c)(1),
(2) Date: Apr. 19, 2016

(87) PCT Pub. No.: WO2015/062027
PCT Pub. Date: May 7, 2015

(65) Prior Publication Data
US 2016/0257569 A1    Sep. 8, 2016

(51) Int. Cl.
*C01B 31/04* (2006.01)

(52) U.S. Cl.
CPC ........ *C01B 31/0446* (2013.01); *C01B 31/043* (2013.01)

(58) Field of Classification Search
CPC . C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
See application file for complete search history.

(56) References Cited

U.S. PATENT DOCUMENTS

2010/0266964 A1    10/2010    Gilje
2011/0256014 A1    10/2011    Hong et al.

FOREIGN PATENT DOCUMENTS

| CN | 102259851 A | 11/2011 |
| CN | 102583340 A | 7/2012 |
| KR | 20130094559 A | 8/2013 |
| KR | 20130112987 A | 10/2013 |
| WO | 2013019476 A2 | 2/2013 |

OTHER PUBLICATIONS

Machine translation of KR 20130094559 to Univ Ulsan Found for Ind Coop.*
Li, et al., Processable aqueous dispersions of graphene nanosheets, Nature Nanotechnology 2008; 3: 101-105.*
Xue, et al., Oxidizing metal ions with graphene oxide: the in situ formation of magnetic nanoparticles on self-reduced graphene sheets for multifunctional applications, Chem. Commun. 2011; 47: 11689-11691.*
Dey, et al., A rapid room temperature chemical route for the synthesis of graphene: metal-mediated reduction of graphene oxide, Chem. Commun. 2012; 48: 1787-1789.*
Bai, Y., et al., "Effect of pH-induced chemical modification of hydrothermally reduced graphene oxide on supercapacitor performance," Journal of Power Sources, vol. 233 p. 313-319 (Jul. 1, 2013).
Dey, R. S., et al., "A rapid room temperature chemical route for the synthesis of graphene:metal-mediated reduction of graphene oxide," Chemical Communication, vol. 48, pp. 1787-1789 (Jan. 3, 2012).
Fan, Z., et al., "An environmentally friendly and efficient route for the reduction of graphene oxide by aluminum powder," Carbon, vol. 48, pp. 1670-1692 (2010).
Farghali, A.A., et al., Preparation, decoration and characterization of graphene sheets for methyl green adsorption,: Journal of Alloys and Compounds, vol. 555, pp. 193-200 (Apr. 5, 2013).
International Search Report and Written Opinion for International Application No. PCT/CN2013/086328, dated Jul. 22, 2014.
Pei, S., and Cheng, H-M., "The reduction of graphene oxide," Carbon, vol. 50, Issue 9, pp. 3210-3228 (2012).
Pham, V.H., et al., "Chemical reduction of an aqueous suspension of graphene oxide by nascent hydrogen," Journal of Material Chemistry, vol. 22, pp. 10530-10536 (2012).

* cited by examiner

*Primary Examiner* — Daniel C McCracken
(74) *Attorney, Agent, or Firm* — Dorsey & Whitney LLP

(57) ABSTRACT

Methods described herein generally relate to preparing graphene. The method may include contacting at least one elemental metal with a composition having graphene oxide under conditions sufficient to reduce at least a portion of the graphene oxide to graphene. Systems and kits for preparing graphene are also disclosed.

20 Claims, 9 Drawing Sheets

METHODS AND SYSTEMS FOR PREPARING GRAPHENE

CROSS-REFERENCE TO RELATED APPLICATIONS

This application is a U.S. national stage filing under 35 U.S.C. § 371 of PCT International Application No. PCT/CN2013/086328 filed on Oct. 31, 2013.

BACKGROUND

Unless otherwise indicated herein, the materials described in this section are not prior art to the claims in this application and are not admitted to be prior art by inclusion in this section.

Graphene is a two-dimensional crystal composed of a single layer of carbon atoms. With its many advantageous properties, such as its light weight, mechanical strength, flexibility, high electrical conductivity, high carrier mobility, and optical transparency, graphene is considered for applications in many fields, such as engineering, electronics, solar cells, and biodevices.

Currently, the preparation of graphene faces three major challenges: preparing graphene with a large area, preparing graphene with a controllable number of layers, and batch production of graphene. Chemical oxidation can be an efficient approach for the batch production of graphene, but chemical oxidation generates graphene oxide which needs to be treated by a reduction step. The reduction step can be bottlenecks in the batch production of graphene. Pure graphene oxide may also agglomerate in the presence of other chemical reducing agents which can affect the uniformity of graphene sheets formed.

Although reducing agents such as hydrazine hydrate, sodium borohydride, or bioactive substances such as ascorbic acid and glucose have been used, they all have safety issues or are high in cost when used batch production. Metals may be used as reducing agents for graphene oxide. However, existing approaches for preparing graphene using metal as a reducing agent is limited to reducing graphene with alkali metals with the aid of chemical reagents such as hydrochloric acid, sulfuric acid, and EDTA, followed by washing the mixture with water or a diluted acid.

Therefore, it will be desirable to provide a method of preparing graphene that can be used in batch production, and that is safe, environmentally-friendly, and non-toxic.

SUMMARY

Methods, systems and kits for preparing graphene are disclosed. In some embodiments, a method of preparing graphene may include contacting at least one elemental metal with a composition comprising graphene oxide under conditions sufficient to reduce at least a portion of the graphene oxide to graphene.

In an embodiment, a system for preparing graphene may include: an enclosure configured to receive at least one elemental metal and a composition comprising graphene oxide; and a mixer configured to mix the at least one elemental metal and the composition to reduce at least a portion of the graphene oxide to graphene.

In an embodiment, a kit for preparing graphene may include: at least one elemental metal; a composition comprising graphene oxide; and instructions for contacting the at least one elemental metal with the composition to prepare graphene.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1B:
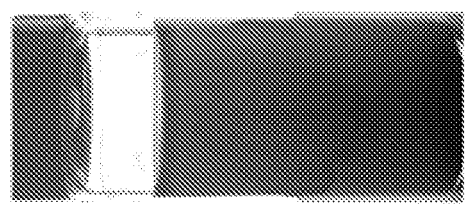
FIGS. 1A-B depict digital images of a composition comprising graphene oxide prior to and 5 minutes after reaction, respectively, as prepared in Example 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The present disclosure generally describes methods and systems for preparing graphene. Accordingly, in some embodiments, a method of preparing graphene may include contacting at least one elemental metal with a composition having graphene oxide under conditions sufficient to reduce at least a portion of the graphene oxide to graphene.

In some embodiments, the contacting step including mixing the at least one elemental metal and the composition. The mixing can be performed by stirring, agitating, or other known methods that can effect the mixing. The graphene oxide in the composition may be obtained by a variety of methods. In some embodiments, the composition may include graphene oxide powder. In some embodiments, the composition may include graphene oxide in a solvent. The solvent can generally include any solvent that can adequately mix the graphene oxide and the elemental metal at conditions sufficient for the elemental metal to reduce at least a portion of the graphene oxide to graphene. Accordingly, the solvent may vary depending upon the elemental metal chosen and the degree of oxidation of the graphene oxide. In some embodiments, the solvent may include water, an organic solvent, or a mixture thereof. Non-limiting examples of suitable organic solvents may include dimethylformamide (DMF), dimethyl sulfoxide (DMSO), N-Methyl-2-pyrrolidone (NMP), tetrahydrofuran (THF), methanol, ethanol, acetone, or any combination thereof.

The elemental metal may be any metal that can be used to react with the graphene oxide to obtain graphene. In some embodiments, the elemental metal may be in the form of a metal powder. In other embodiments, the elemental metal may be in the form of a scrap metal. In some embodiments, the elemental metal may be in the form of a metal block. In other embodiments, the elemental metal may be in the form of a combination of a metal powder, scrap metal, or a metal block. Non-limiting examples of suitable metals may include zinc (Zn), iron (Fe), manganese (Mn), nickel (Ni), cobalt (Co), tin (Sn), zirconium (Zr), molybdenum (Mo), lithium (Li), sodium (Na), potassium (K), calcium (Ca), magnesium (Mg), chromium (Cr), cadmium (Cd), lead (Pb), cerium (Ce), titanium (Ti), or any combination thereof. In some embodiments, the degree of reduction of the graphene oxide in the composition may be controlled through the selection of metals with different reactivity. It will be appreciated that the elemental metal may be obtained from waste metal scraps sourced from industries to lower material cost and to recycle waste metal scraps.

Contacting at least one elemental metal with the composition may include contacting at a suitable temperature and pressure over a time interval that is sufficient for the reaction to proceed. The pressure at which the contacting step is carried out is not particularly limiting. In some embodiments, it may be advantageous to perform the contacting step at ambient pressure (for example, at about atmospheric pressure) in order to reduce the processing costs and to simplify the design and specifications of a reaction vessel. In some embodiments, the contacting step may include contacting at about atmospheric pressure. In some embodiments, the contacting step may include contacting at ambient temperature. In some embodiments, the ambient temperature may be about 4° C. to about 40° C. In some embodiments, the ambient temperature may be about 20° C. to about 40° C. In some embodiments, the contacting step may include contacting at a temperature of about 1° C. to about 99° C. In other embodiments, the contacting step may occur at a temperature of greater than about 20° C. In other embodiments, the contacting step may occur at a temperature of no greater than about 40° C. For example, the contacting may be carried out at about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., or any temperature between these values. In some embodiments, the temperature may vary throughout the step, whereas in other embodiments, the temperature is constant throughout the step.

The time period for the contacting step is not particularly limiting. For example, contacting at a suitable temperature and pressure may occur for a time period of at least about 1 minute. In some embodiments, the time period is less than about 72 hours, 48 hours, or 24 hours. In some embodiments, contacting at a suitable temperature and pressure may occur for about 5 minutes to about 24 hours. For example, the contacting step may occur for about 5 minutes to about 10 minutes, about 10 minutes to about 15 minutes, about 15 minutes to about 20 minutes, about 20 minutes to about 25 minutes, about 25 minutes to about 30 minutes, about 30 minutes to about 1 hour, about 1 hour to about 4 hours, about 4 hours to about 8 hours, about 8 hours to about 12 hours, about 12 hours to about 16 hours, about 16 hours to about 20 hours, about 20 hours to about 24 hours, and any time between these values (including endpoints).

In some embodiments, contacting at least one elemental metal with the composition may include exposing the at least one elemental metal and the composition to a thermal field, microwave, light irradiation, laser, ultrasonic irradiation, magnetic field, plasma irradiation, or any combination thereof. For example, in some embodiments, a hydrothermal kettle, a microwave tank, an autoclave, or a combination thereof may be used. In some embodiments, the contacting step may include exposing the at least one elemental metal and the composition to a thermal field, microwave, light irradiation, laser, ultrasonic irradiation, magnetic field, plasma irradiation, or any combination thereof at a suitable temperature and pressure over a time interval that is sufficient for the reaction to proceed. The pressure at which the contacting is performed is not particularly limiting. In some embodiments, it may be advantageous to perform the contacting step at ambient pressure (for example, about atmospheric pressure) in order to reduce the processing costs and to simplify the design and specifications of a reaction vessel. In some embodiments, the contacting step may include contacting at about atmospheric pressure. In some embodiments, the contacting step may include contacting at a temperature of greater than about 100° C. In some embodiments, the contacting step may include contacting at a temperature of about 100° C. to about 250° C. In some embodiments, the contacting step may include contacting at a temperature of about 150° C. to about 200° C. For example, the contacting step may include contacting at a temperature of about 100° C. to about 110° C., about 110° C. to about 120° C., about 120° C. to about 130° C., about 130° C. to about 140° C., about 140° C. to about 150° C., about 150° C. to about 160° C., about 160° C. to about 170° C., about 170° C. to about 180° C., about 180° C. to about 190° C., about 190° C. to about 200° C., about 200° C. to about 210° C., about 210° C. to about 220° C., about 220° C. to about 230° C., about 230° C. to about 240° C., about 240° C. to about 250° C., or any temperature between these values (including endpoints). In some embodiments, the contacting step may occur for a period of at least about 24 hours. In some embodiments, the contacting step may include contacting at a temperature of equal to or greater than about 100° C. for a time interval of at least about 24 hours to obtain graphene. For example, in some embodiments, the at least one elemental metal and the composition may be contacted at a temperature of about 200° C. for a time interval of about 24 hours to obtain graphene.

Although various non-limiting examples of suitable conditions are disclosed in the present application, the skilled artisan, guided by the teachings of the present application, will appreciate that numerous other conditions may be suitable depending upon various properties such as choice of solvent used, choice of elemental metal used, whether the graphene oxide is in powder or solution form, and so on).

In some embodiments, the method of preparing graphene may further include separating the graphene from the at least one elemental metal and the composition; washing the graphene; and drying the graphene. For example, the graphene may be filtered or precipitated from the solution using standard techniques. As a specific example, the graphene may be filtered and washed at least twice with distilled water. As another example, the graphene may be filtered and washed with an acid. Non-limiting examples of acids may include hydrochloric acid, nitric acid, or sulfuric acid. In some embodiments, the acid may be diluted prior to washing the graphene. The acid may also include waste acid from chemical industries.

In some embodiments, a system for preparing graphene may include an enclosure configured to receive at least one elemental metal and a composition having graphene oxide; and a mixer configured to mix the at least one elemental metal and the composition to reduce at least a portion of the graphene oxide to graphene. In some embodiments, the mixer can be a magnetically driven stir bar, an impeller driven mixer, or other known means that can effect the mixing of the at least one elemental metal and the composition. In some embodiments, the at least one elemental metal be in the form of a metal powder, scrap metal, a metal block, or any combination thereof. Non-limiting examples of suitable metals may include zinc (Zn), iron (Fe), manganese (Mn), nickel (Ni), cobalt (Co), tin (Sn), zirconium (Zr), molybdenum (Mo), lithium (Li), sodium (Na), potassium (K), calcium (Ca), magnesium (Mg), chromium (Cr), cadmium (Cd), lead (Pb), cerium (Ce), titanium (Ti), or any combination thereof. In some embodiments, the composition may include graphene oxide in powder form, or graphene oxide in a solvent. In some embodiments, the solvent may include water, an organic solvent, or a mixture thereof. In some embodiments, the organic solvent may include dimethylformamide (DMF), dimethyl sulfoxide (DMSO), N-Methyl-2-pyrrolidone (NMP), tetrahydrofuran (THF), methanol, ethanol, acetone, or any combination thereof. In some embodiments, the system may further include at least one energy source configured to expose the at least one elemental metal and the composition to a thermal field, microwave, light irradiation, laser, ultrasonic irradiation, magnetic field, plasma irradiation, or any combination thereof.

In some embodiments, a kit for preparing graphene may include at least one elemental metal; a composition comprising graphene oxide; and instructions for contacting the at least one elemental metal with the composition to prepare graphene. Such instructions are consistent with the methods disclosed herein. In some embodiments, the at least one elemental metal may be in the form of a metal powder, scrap metal, a metal block, or any combination thereof. Non-limiting examples of suitable metals may include zinc (Zn), iron (Fe), manganese (Mn), nickel (Ni), cobalt (Co), tin (Sn), zirconium (Zr), molybdenum (Mo), lithium (Li), sodium (Na), potassium (K), calcium (Ca), magnesium (Mg), chromium (Cr), cadmium (Cd), lead (Pb), cerium (Ce), titanium (Ti), or any combination thereof. In some embodiments, the composition may include graphene oxide in powder form, or graphene oxide in a solvent. In some embodiments, the solvent may include water, an organic solvent, or a mixture thereof. In some embodiments, the organic solvent may include dimethylformamide (DMF), dimethyl sulfoxide (DMSO), N-Methyl-2-pyrrolidone (NMP), tetrahydrofuran (THF), methanol, ethanol, acetone, or any combination thereof. In some embodiments, the kit may further include an enclosure configured to receive the at least one elemental metal and the composition; and a mixer configured to mix the at least one elemental metal and the composition. The mixer can, for example, be a magnetically driven stir bar, an impeller driven mixer, or other known means that can effect the mixing of the at least one elemental metal and the composition. In some embodiments, the kit may further include at least one energy source configured to expose the at least one elemental metal and the composition to a thermal field, microwave, light irradiation, laser, ultrasonic irradiation, magnetic field, plasma irradiation, or any combination thereof.

EXAMPLES

Additional embodiments are disclosed in further detail in the following examples, which are not in any way intended to limit the scope of the claims.

Example 1

Figure 1A:
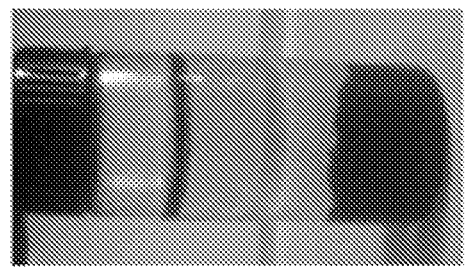

Preparation of Graphene Using Graphene Oxide Solution with Zinc 20 ml of an aqueous solution of 0.6 mg/mL graphene oxide in water was prepared. The solution was tawny in color. FIG. 1A shows a digital image of the solution. 24 mg of zinc powder was weighed and added to the aqueous solution of graphene oxide. The mixture was stirred for 5 minutes at 20° C. and at 1 atm, and set aside for about 1 minute. It was observed that the upper portion of the solution became colorless and transparent, while black graphene was precipitated at the bottom of the solution. FIG. 1B shows a digital image of the solution having graphene formed at the bottom about 5 minutes after the reaction at 20° C. and 1 atm. This example shows that graphene was generated at normal temperature and pressure by exposure of the graphene oxide in solution form to elemental zinc in powder form. The graphene was also formed within a very short time, that is, after only 5 minutes.

Example 2

Figure 2B:
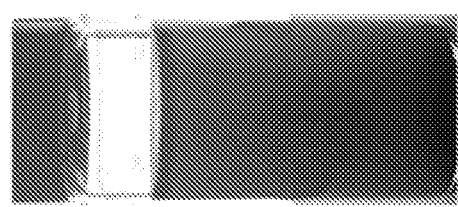
FIGS. 2A-B depict digital images of a composition comprising graphene oxide prior to and 10 minutes after reaction, respectively, as prepared in Example 2.
Figure 2A:
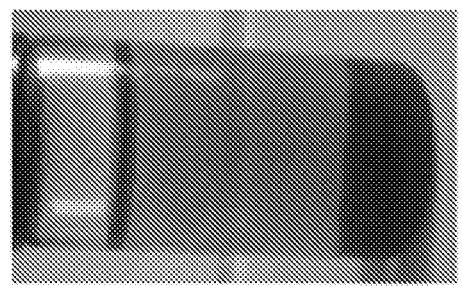

Preparation of Graphene Using Graphene Oxide Solution with Manganese 20 ml of an aqueous solution of 0.6 mg/mL of graphene oxide in water was prepared. The solution was tawny in color. FIG. 2A shows a digital image of the solution. 22 mg of manganese powder was weighed and added to the aqueous solution of graphene oxide. The mixture was stirred for 10 minutes at 20° C. and at 1 atm, and set aside for 1-2 minutes. It was observed that the upper portion of the solution became colorless and transparent, while black graphene was precipitated at the bottom of the solution. FIG. 2B shows a digital image of the solution having graphene formed at the bottom about 10 minutes after the reaction at 20° C. and 1 atm. This example shows that graphene was generated at normal temperature and pressure by exposure to elemental manganese in powder form. The graphene was also formed within a very short time, that is, after only 10 minutes.

Example 3

Figure 3:
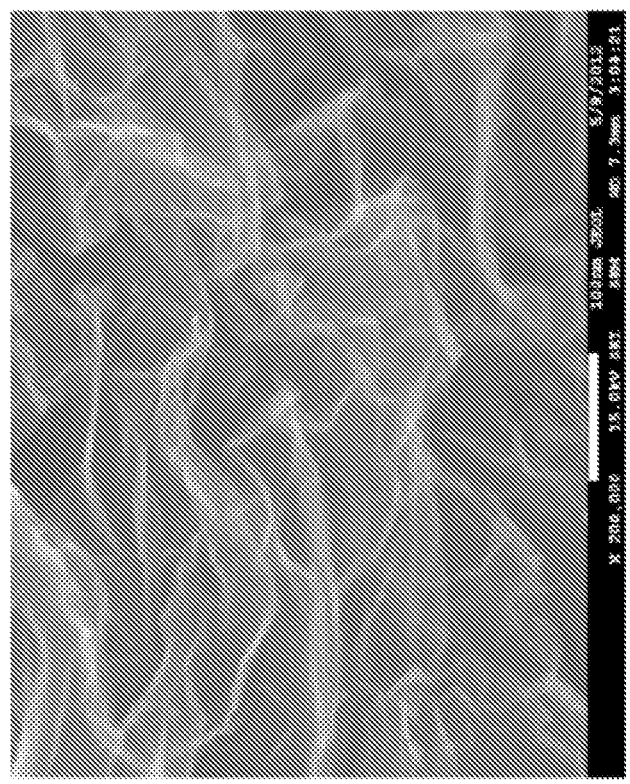
FIG. 3 depicts a scanning electron microscopy (SEM) image of a composition having graphene as prepared in Example 3.

Preparation of Graphene Using Graphene Oxide Solution with Iron 50 mL of an aqueous solution of graphene oxide in water at a concentration of 0.5 mg/mL was prepared into a clear tawny solution. 56 mg of iron powder was weighed and added to the aqueous solution of graphene oxide. The mixture was stirred, added into a hydrothermal kettle, and treated at 150° C. for 24 hours. It was observed that the upper portion of the solution became colorless and transparent, while black graphene was precipitated at the bottom of the solution. The mixture was filtered and the graphene washed with dilute hydrochloric acid to give a black powder. FIG. 3 shows a scanning electron microscopy (SEM) image of the resulting black powder having well-dispersed graphene sheets after the hydrothermal process using iron powder as a reducing agent. This example shows that well dispersed graphene sheets can be prepared by a simple reaction of graphene oxide in aqueous solution with elemental iron at 150° C. for 24 hours.

Example 4

Figure 4:
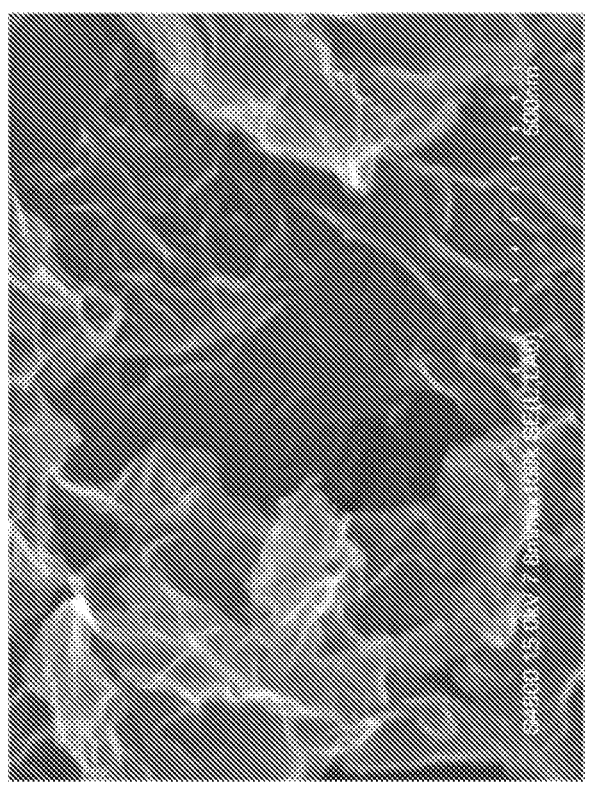
FIG. 4 depicts a scanning electron microscopy (SEM) image of a composition having graphene as prepared in Example 4.

Preparation of Graphene Using Graphene Oxide Solution with Copper 50 mL of an aqueous solution of graphene oxide in water at a concentration of 0.5 mg/mL was prepared into a clear tawny solution. 64 mg of copper powder was weighed and added to the aqueous solution of graphene oxide. The mixture was stirred, added into a hydrothermal kettle, and treated at 200° C. for 24 hours. It was observed that the upper portion of the solution became colorless and transparent, while black graphene was precipitated at the bottom of the solution. The mixture was filtered and the graphene washed with dilute nitric acid to give black powder. FIG. 4 shows a scanning electron microscopy (SEM) image of the resulting black powder having well-dispersed graphene sheets after the hydrothermal process using copper powder as a reducing agent. This example shows that well dispersed graphene sheets can be prepared by a simple reaction of graphene oxide in aqueous solution with elemental copper at 200° C. for 24 hours.

Example 5

Preparation of Graphene Using Graphene Oxide Solution with Aluminum 50 mL of an aqueous solution of graphene oxide in water at a concentration of 0.6 mg/mL was prepared into a clear tawny solution. 27 mg of aluminum powder was weighed and added to the aqueous solution of graphene oxide. The mixture was stirred, and then added into a hydrothermal kettle. After the mixture was treated at 150° C. for 24 hours, graphene was obtained, while no change was observed for the corresponding aluminum powder. The same experiment was repeated with another 50 mL of an aqueous solution of graphene oxide at a concentration of 0.6 mg/mL, but without the aluminum powder.

Figure 5A:
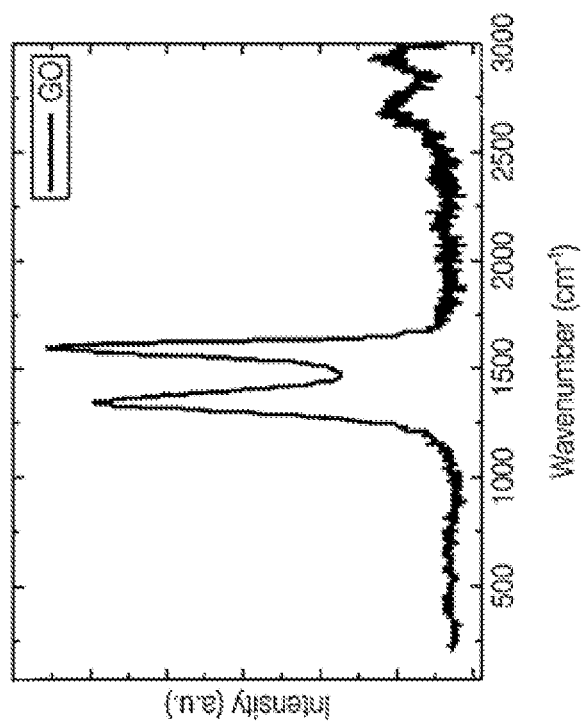
FIG. 5A depicts a Raman pattern for a composition having graphene oxide.
Figure 5B:
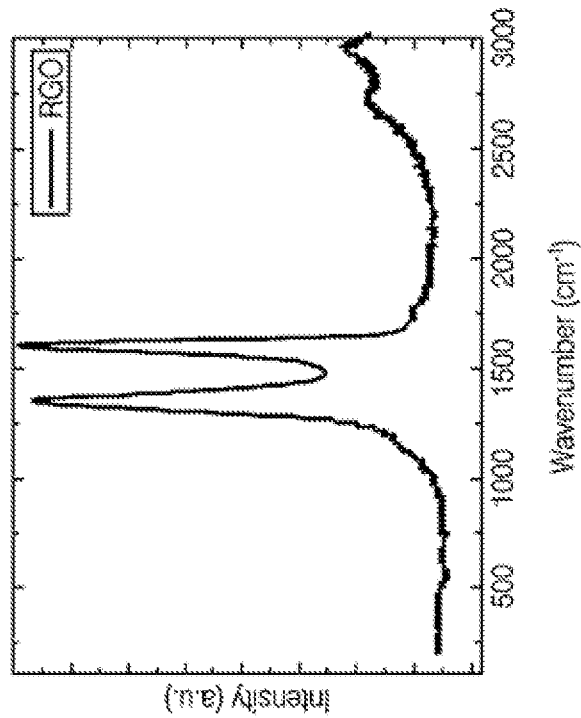
FIG. 5B shows a Raman pattern for a composition having graphene, obtained by hydrothermal processing of graphene oxide alone, as prepared in Example 5.
Figure 5D:
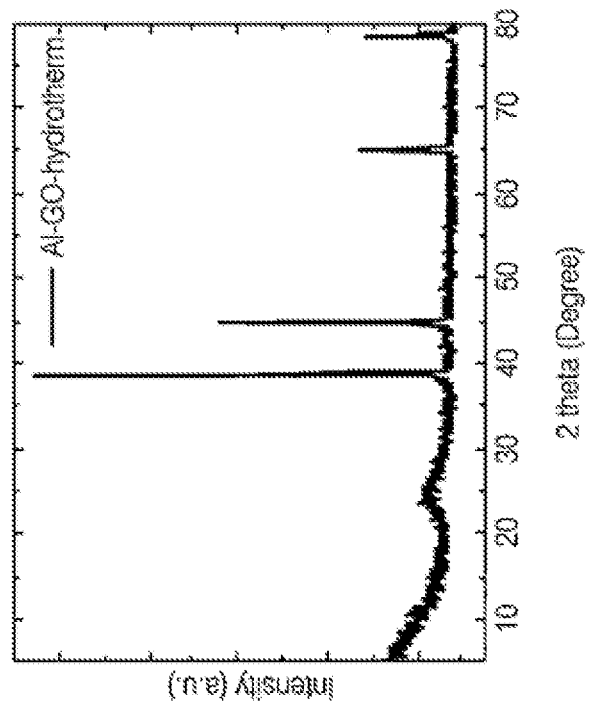
FIG. 5D depicts an X-ray diffraction (XRD) pattern of a composition having graphene as prepared in Example 5.
Figure 5C:
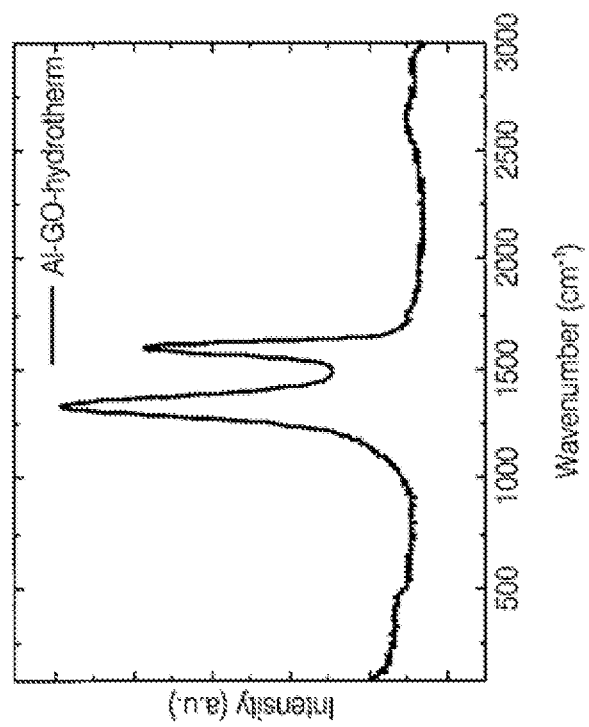
FIG. 5C shows a Raman pattern for a composition having graphene, obtained by hydrothermal processing of graphene oxide in the presence of aluminum powder.

FIG. 5C shows a Raman pattern for a composition having graphene, obtained by the hydrothermal process using aluminum powder as a blocker. FIG. 5A shows a comparative example of a Raman pattern for a composition of graphene oxide. FIG. 5B shows a Raman pattern for a composition having graphene, obtained by hydrothermal process of graphene oxide alone. Comparing graphene oxide (FIG. 5A) with graphene obtained by a hydrothermal processing of graphene oxide alone (FIG. 5B), and with graphene obtained by a hydrothermal processing of graphene oxide with aluminum powder, the extent of reduction of graphene oxide was significantly enhanced in the presence of aluminum powder. This demonstrates the enhanced reducing effect of elemental metals on the reduction of graphene oxide to graphene.

FIG. 5D shows an X-ray diffraction (XRD) pattern of a mixture of having graphene and aluminum powder, obtained by hydrothermal processing of graphene oxide and aluminum powder, prior to removing the aluminum powder from the mixture. The mixture was filtered and washed with dilute hydrochloric acid solution to give black graphene powder. This example shows that graphene can be prepared by a simple reaction of graphene oxide in aqueous solution with elemental aluminum at 150° C. for 24 hours.

Example 6

Figure 6A:
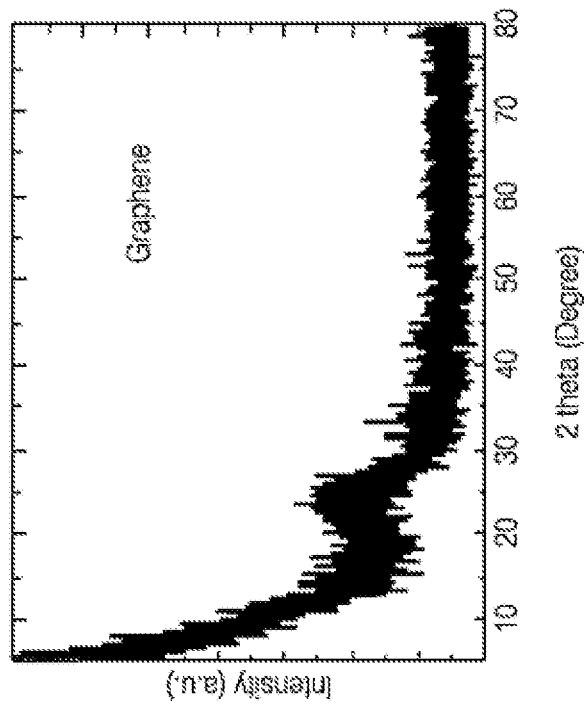
FIGS. 6A-B depict X-ray diffraction (XRD) patterns of a composition having graphene as prepared in Example 6.
Figure 6B:
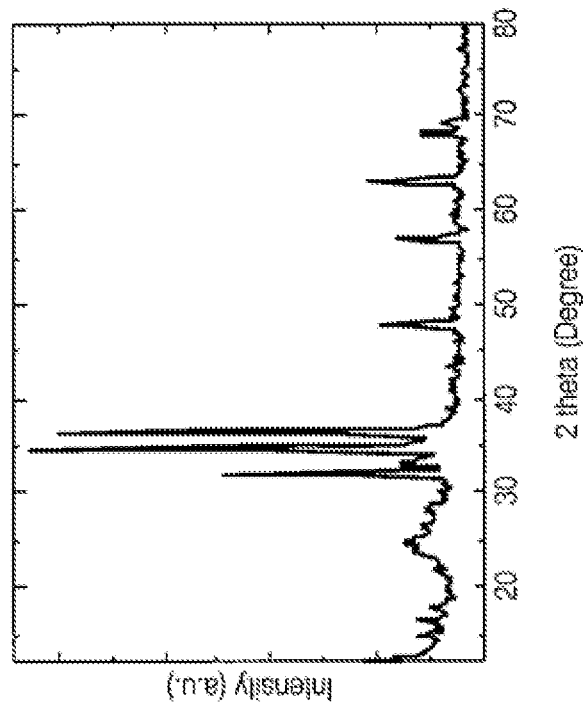

Preparation of Graphene Using Graphene Oxide Solution with Zinc Under Microwave Irradiation 10 mL of an aqueous solution of graphene oxide in water at a concentration of 0.5 mg/mL was prepared. 12 mg of zinc powder was then added, and the mixture was stirred before it was placed into a microwave tank. The mixture was kept in the sealed tank at 150° C. for 15 minutes to obtain a mixture of graphene and zinc oxide, which was washed with dilute hydrochloric acid solution to give pure graphene. FIG. 6A shows an X-ray diffraction (XRD) pattern of the composition having graphene prior to being washed with dilute hydrochloric acid. FIG. 6B shows an X-ray diffraction pattern of the resulting composition of graphene after being washed with dilute hydrochloric acid. This example shows that graphene can be obtained by a simple reaction of graphene oxide in aqueous solution with elemental zinc at 150° C. for 15 minutes under an influence from an energy source such as microwave irradiation.

Example 7

Figure 7B:
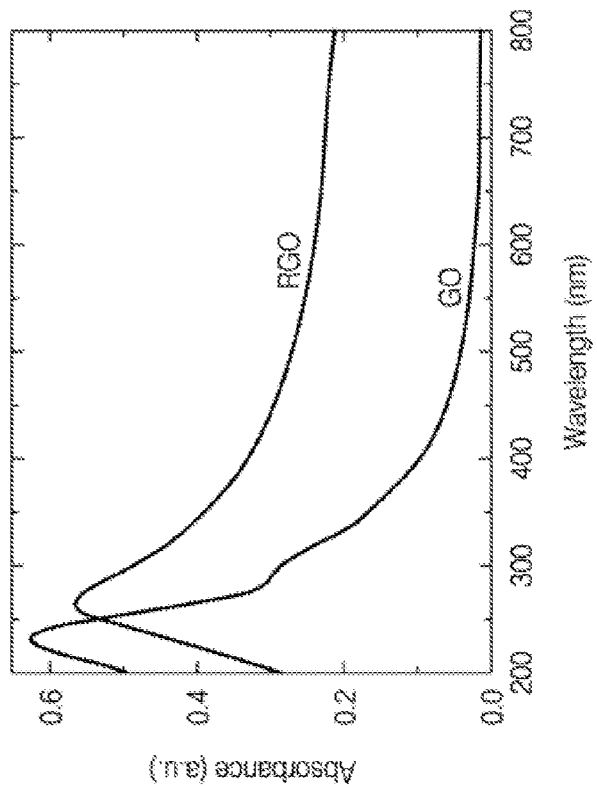
FIG. 7B depicts an ultraviolet-visible adsorption spectrum of a composition comprising graphene oxide prior to and after reaction as prepared in Example 7.
Figure 7A:
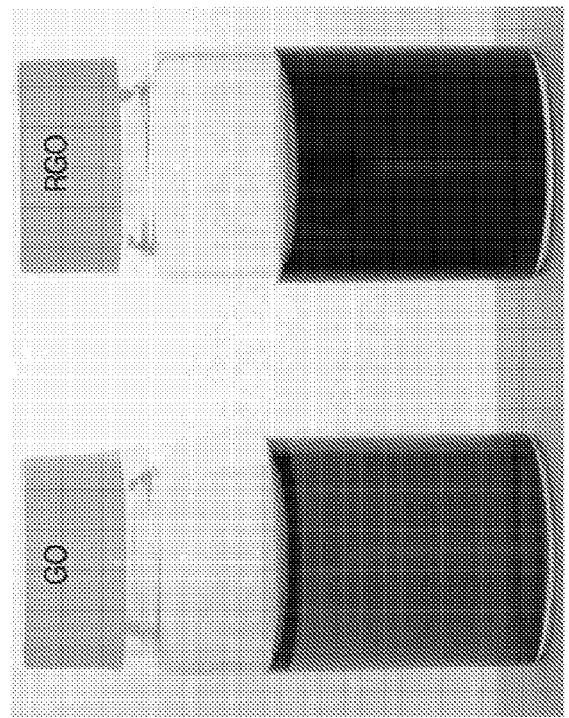
FIG. 7A depicts a digital image of a composition comprising graphene oxide prior to and after reaction as prepared in Example 7.

Preparation of Graphene Using Graphene Oxide Solution with Titanium 50 mL of an aqueous solution of graphene oxide in water at a concentration of 0.6 mg/mL was prepared into a clear tawny solution. 48 mg of titanium powder was weighed and added to the aqueous solution of graphene oxide. The mixture was stirred, added into a hydrothermal kettle, and treated at 150° C. for 24 hours. A suspension of graphene was obtained. FIG. 7A shows a digital image of the composition that includes graphene oxide prior to (left) and after (right) the hydrothermal processing using titanium powder as a reducing agent. FIG. 7B shows an ultraviolet-visible adsorption spectrum of the composition comprising graphene oxide prior to and after the hydrothermal processing using titanium powder as a reducing agent. This example shows that a suspension of graphene can be prepared after reaction of graphene oxide in aqueous solution with elemental titanium at 150° C. for 24 hours.

Example 8

Figure 8B:
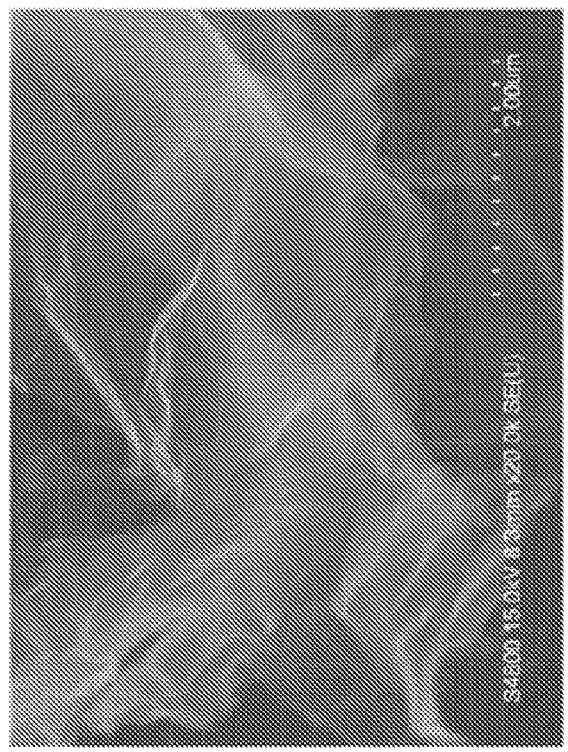
FIGS. 8A-B depict scanning electron microscopy (SEM) images of a composition having graphene as prepared in Example 8.
Figure 8A:
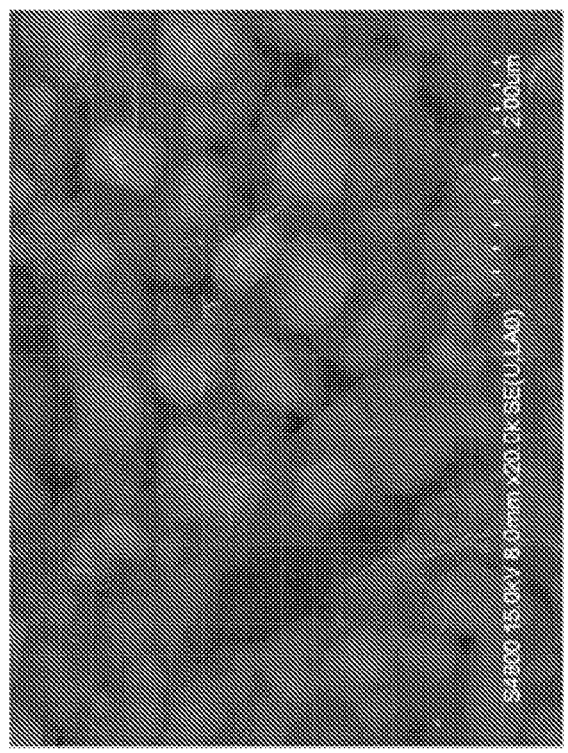

Preparation of Graphene Using Graphene Oxide Solution with Copper Sheets 6 mL of an aqueous solution of graphene oxide in water (5 mg/mL) was measured, and added to 44 mL of deionized water. The solution was transferred into an inner container of an autoclave with a capacity of 100 mL. Two copper sheets, which were cut into a size of 1×3 cm, were placed horizontally at the bottom of the inner container. The mixture was treated at a constant temperature of 150° C. for 24 hours. After the mixture had cooled down, the copper sheets were removed and cleaned with water to give a graphene film deposited on the copper oxide/copper sheet substrate, which was then cleaned with dilute hydrochloric acid to give pure graphene. FIG. 8A shows a scanning electron microscopy (SEM) image of the graphene deposited on the copper oxide/copper sheet substrate surface after the hydrothermal process using copper as a reducing agent. FIG. 8B shows a SEM image of the graphene after being washed with dilute hydrochloric acid. This example shows that graphene can be prepared by a reaction of graphene oxide in aqueous solution with elemental copper at 150° C. for 24 hours. The Example also showed the feasibility of using sheets of metal scraps as the reducing agent in place of the powdered metals used in the earlier examples.

With respect to the use of substantially any plural and/or singular terms herein, those having skill in the art can translate from the plural to the singular and/or from the singular to plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method of preparing graphene, the method comprising:
contacting at least one elemental metal with a composition comprising graphene oxide; and
reacting the composition with the at least one elemental metal to reduce at least a portion of the graphene oxide to graphene, wherein the reacting comprises exposing the at least one elemental metal and the composition to a microwave, light irradiation, laser, magnetic field, plasma irradiation, or any combination thereof, at atmospheric pressure.

2. The method of claim 1, wherein the at least one elemental metal is in the form of a metal powder, scrap metal, a metal block, or any combination thereof.

3. The method of claim 1, wherein the at least one elemental metal is zinc (Zn), iron (Fe), manganese (Mn), nickel (Ni), cobalt (Co), tin (Sn), zirconium (Zr), molybdenum (Mo), lithium (Li), sodium (Na), potassium (K), calcium (Ca), magnesium (Mg), chromium (Cr), cadmium (Cd), lead (Pb), cerium (Ce), titanium (Ti), or any combination thereof.

4. The method of claim 1, wherein the composition comprises graphene oxide in a solvent.

5. The method of claim 4, wherein the solvent comprises water, an organic solvent, or a mixture thereof.

6. The method of claim 5, wherein the organic solvent comprises dimethylformamide (DMF), dimethyl sulfoxide (DMSO), N-Methyl-2-pyrrolidone (NMP), tetrahydrofuran (THF), methanol, ethanol, acetone, or any combination thereof.

7. The method of claim 1, wherein the reacting comprises reacting at a temperature of about 1° C. to about 99° C.

8. The method of claim 1, wherein the reacting comprises reacting for a period of about 5 minutes to about 24 hours.

9. The method of claim 1, further comprising:
separating the graphene from the at least one elemental metal and the composition; and
drying the graphene.

10. The method of claim 1, wherein the reacting comprises reacting at a temperature of about 100° C. to about 250° C.

11. The method of claim 1, wherein the reacting comprises reacting for a period of at least about 24 hours.

12. The method claim 9, further comprising washing the graphene.

13. The method of claim 12, wherein washing the graphene comprises washing with an acid.

14. The method of claim 1, wherein at least a portion of the contacting and at least a portion of the reacting are performed simultaneously.

15. The method of claim 4, wherein the solvent consists essentially of water, an organic solvent, or a mixture thereof.

16. A method of preparing graphene, the method comprising:
contacting at least one elemental metal with a composition, the composition comprising graphene oxide in a solvent;
reacting the composition with the at least one elemental metal at a temperature of 20° C. to about 40° C.;
precipitating the graphene;
washing the graphene; and
drying the graphene.

17. The method of claim 16, wherein the reacting comprises reacting the composition with the at least one elemental metal.

18. A method of preparing graphene, the method comprising:
contacting at least one elemental metal with a composition, the composition comprising graphene oxide in a solvent;
reacting the composition with the at least one elemental metal at a temperature of 150° C. to 250° C.;
precipitating the graphene;
washing the graphene; and
drying the graphene.

19. The method of claim 18, wherein the reacting comprises contacting at a temperature of about 150° C. to about 200° C.

20. The method of claim 18, wherein the reacting comprising reacting the composition with the at least one elemental metal.

* * * * *

UNITED STATES PATENT AND TRADEMARK OFFICE
CERTIFICATE OF CORRECTION

PATENT NO. : 9,908,780 B2
APPLICATION NO. : 15/030583
DATED : March 6, 2018
INVENTOR(S) : Zhao et al.

Page 1 of 1

It is certified that error appears in the above-identified patent and that said Letters Patent is hereby corrected as shown below:

In the Specification

In Column 1, Lines 4-5, delete "CROSS-REFERENCE TO RELATED APPLICATIONS" and insert -- CROSS-REFERENCE TO RELATED APPLICATION --, therefor.

In Column 1, Line 8, delete "PCT International" and insert -- International --, therefor.

In Column 3, Line 10, delete "effect" and insert -- affect --, therefor.

In Column 5, Line 32, delete "effect" and insert -- affect --, therefor.

In Column 6, Line 15, delete "effect" and insert -- affect --, therefor.

In Column 9, Line 50, delete "recitation no" and insert -- recitation, no --, therefor.

In Column 10, Line 4, delete "general such" and insert -- general, such --, therefor.

In Column 10, Line 13, delete "general such" and insert -- general, such --, therefor.

Signed and Sealed this
Fifth Day of June, 2018

Andrei Iancu
*Director of the United States Patent and Trademark Office*